C. E. AKELEY.
ATTACHMENT FOR MOTION PICTURE CAMERAS.
APPLICATION FILED OCT. 31, 1918.
1,314,494.
Patented Sept. 2, 1919.
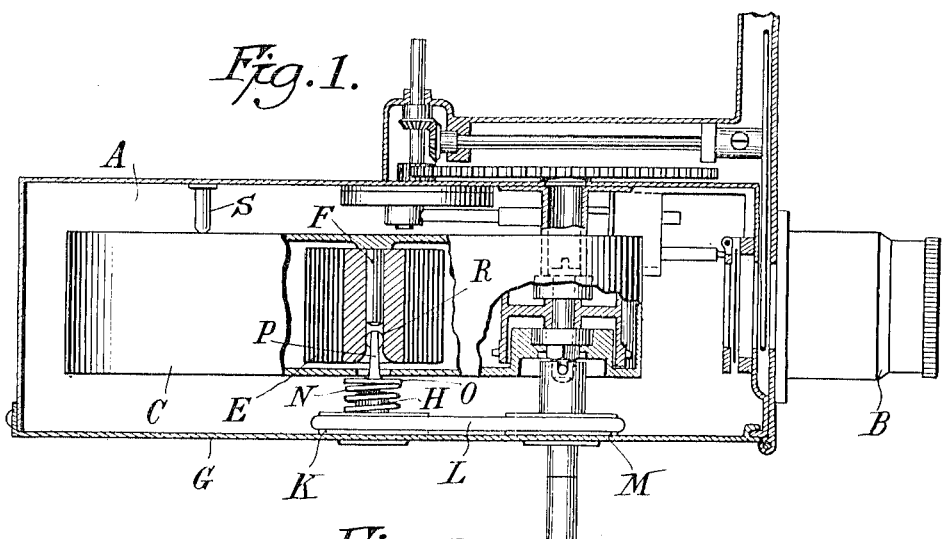
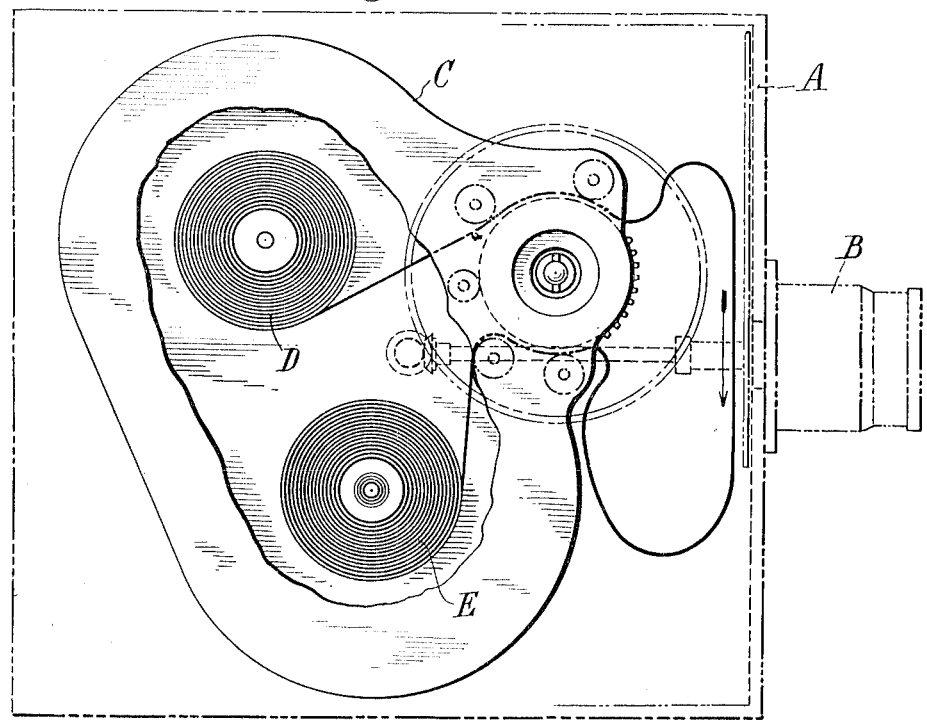
Carl E. Akeley Inventor
By his Attorneys

UNITED STATES PATENT OFFICE.

CARL E. AKELEY, OF NEW YORK, N. Y., ASSIGNOR TO AKELEY CAMERA INC., OF NEW YORK, N. Y., A CORPORATION.

ATTACHMENT FOR MOTION-PICTURE CAMERAS.

1,314,494.     Specification of Letters Patent.     Patented Sept. 2, 1919.

Original application filed April 12, 1918, Serial No. 228,093. Divided and this application filed October 31, 1918. Serial No. 260,440.

*To all whom it may concern:*

Be it known that I, CARL E. AKELEY, a citizen of the United States, residing at New York city, county and State of New York, have invented certain new and useful Improvements in Attachments for Motion-Picture Cameras, of which the following is a full, clear, and exact description.

This application is a division of an application filed by me on April 12th, 1918, Ser. No. 228,093, for a trench camera, and is based upon a device shown and described in connection with the camera of said prior application as a means for holding the film magazine in position and imparting rotary movement to the winding reel.

The improvement is illustrated in the accompanying drawings in which—

Figure 1 is a part sectional view of a portion of the camera casing, the film magazine therein and the improved spindle support in its proper relation to the winding reel.

Fig. 2 is a side view of the film magazine with a part of its side wall broken away.

The special construction of the camera to which this invention is or may be applied is not material in the present case with the exception that it should contain a removable or equivalent film magazine with a winding reel therein. In the drawing I therefore show a camera casing A with a lens holder B and a film magazine C which may be of any proper or desired construction.

The film magazine C contains a supply and a winding reel designated respectively by the letters D, E, and any suitable provision is to be made for inserting and withdrawing these reels or spools. The winding reel is slipped over a spindle F set in the side of the magazine and when in place there is an unfilled portion of its hollow center.

Opposite this hollow portion is an opening in the side wall of the magazine.

One side G of the camera casing A is hinged and carries a spindle H having thereon a grooved pulley K connected by a driving belt L with the main driving pulley M. It will be understood, however, that any other suitable means for imparting rotation to the spindle H may be employed.

The spindle H has attached to it a spiral spring N carrying a flat plate O, from which extends a pin or stud P having a flat end R that engages with the walls of the hollow center of the winding spool when the hinged side of the casing is closed and the stud P forced through the opening in the wall of the film magazine.

When the parts are in this their operative position, the plate O closes the film magazine to exclude the light and a spring driving connection between the spindle H and the winding spool is established. Hence when the driving shaft of the instrument is turned the winding spool will be operated.

The spring N moreover forces the film magazine against suitable stops S and holds it in its proper position. The spring spindle has therefore the double function of holding the film magazine in place and of imparting rotary movement to the winding spool.

Having thus described my invention what I claim is:—

1. The combination with a camera casing of a film magazine, or box removable therefrom, a winding spool in said box, a spindle comprising a spiral spring adapted to engage with the winding spool and at the same time exert pressure on the film magazine to hold the latter in place.

2. The combination with a camera casing of a film magazine removable therefrom, a winding spool, in said magazine, a spindle set in the camera casing, a spiral spring secured thereto carrying a pin or stud that engages with the winding spool and adapted at the same time to exert pressure on the film magazine to hold the same in place.

3. The combination with a camera casing of a film magazine removable therefrom, a winding spool in the magazine, a spindle mounted in the camera casing, a spiral spring secured thereto, a pin carried by the spring and adapted to engage with the winding spool, a plate also carried by the spring and forced thereby against the film magazine, whereby the winding spool is rotated and the film magazine held in place by the spring.

In testimony whereof I hereunto affix my signature.

CARL E. AKELEY.